United States Patent
Kong et al.

(10) Patent No.: US 9,321,359 B2
(45) Date of Patent: Apr. 26, 2016

(54) POWER SUPPLY SYSTEM AND METHOD FOR CHARGING BATTERY OF VEHICLE

(71) Applicant: Hyundai Motor Company, Seoul (KR)

(72) Inventors: Hun Kong, Seoul (KR); Dongjun Lee, Gyeonggi-Do (KR); Gyu Yeong Choe, Gyeonggi-Do (KR); Gun Soo Kang, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 217 days.

(21) Appl. No.: 14/096,403

(22) Filed: Dec. 4, 2013

(65) Prior Publication Data

US 2014/0253018 A1   Sep. 11, 2014

(30) Foreign Application Priority Data

Mar. 7, 2013   (KR) .......................... 10-2013-0024611

(51) Int. Cl.
*H02J 7/00* (2006.01)
*B60L 11/18* (2006.01)

(52) U.S. Cl.
CPC ......... B60L 11/1812 (2013.01); B60L 11/1838 (2013.01); H02J 7/0054 (2013.01); H02J 7/0055 (2013.01); *Y02T 10/7005* (2013.01); *Y02T 10/7072* (2013.01); *Y02T 90/121* (2013.01); *Y02T 90/127* (2013.01); *Y02T 90/128* (2013.01); *Y02T 90/14* (2013.01); *Y02T 90/163* (2013.01)

(58) Field of Classification Search
CPC ... Y02T 10/7005; Y02T 90/14; Y02T 10/705; Y02T 10/7088; Y02E 60/12
USPC ......................................................... 320/104
See application file for complete search history.

(56) References Cited

U.S. PATENT DOCUMENTS

| | | | | |
|---|---|---|---|---|
| 8,860,244 | B2 * | 10/2014 | Hattori | H02J 7/1423 307/9.1 |
| 2003/0233179 | A1 * | 12/2003 | Matsubara | B60T 8/885 701/36 |
| 2011/0288705 | A1 * | 11/2011 | Kawasaki | B60L 11/1803 701/22 |
| 2012/0181983 | A1 * | 7/2012 | Khan | B60L 11/1816 320/109 |

FOREIGN PATENT DOCUMENTS

KR   10-2012-0106379   9/2012

\* cited by examiner

*Primary Examiner* — Arun Williams
(74) *Attorney, Agent, or Firm* — Mintz Levin Cohn Ferris Glovsky and Popeo, P.C.; Peter F. Corless

(57) ABSTRACT

A power supply system and method for charging a battery of a vehicle are provided and include a charger that is configured to charge the battery and a charging controller that is configured to receive a voltage to charge the battery and operate the charger. An auxiliary battery is configured to supply a first DC voltage to operate the charging controller and a power supplier is configured to generate a second DC voltage greater than the first DC voltage using external AC power, and to supply the second DC voltage to the charging controller as a driving power source to charge the battery. First and second diodes are respectively installed at output ends of the power supplier and the auxiliary battery, a cathode voltage of the second diode is increased when the power supplier supplies the second DC voltage, and the first DC voltage of the auxiliary battery is blocked.

14 Claims, 3 Drawing Sheets

POWER SUPPLY SYSTEM AND METHOD FOR CHARGING BATTERY OF VEHICLE

CROSS-REFERENCE TO RELATED APPLICATION

This application claims priority to and the benefit of Korean Patent Application No 10-2013-0024611 filed in the Korean Intellectual Property Office on Mar. 7, 2013, the entire contents of which are incorporated herein by reference.

BACKGROUND (a) Field of the Invention

The present invention relates to a power supply system for charging a battery of a vehicle, and method thereof. More particularly, the present invention relates to a power supply system for charging a battery for an electric vehicle and a plug-in hybrid vehicle, and a method thereof.

(b) Description of the Related Art

Compared to a general internal combustion engine vehicle, an electric vehicle (EV) and a hybrid electric vehicle (HEV), which are environmentally friendly vehicles, are operated by a motor using battery power. Since environmentally friendly vehicles are operated by a motor, a high voltage large capacity battery (hereinafter referred to as a "high voltage battery") is mounted within the vehicle and a plug-in charging method may be used to charge the high voltage battery using an external commercial power supply. In addition, an on-board charger is provided in the environmentally-friendly vehicles. The on-board charger rectifies external commercial power for offering plug-in charging and charges the high voltage battery.

Meanwhile, a 12 V auxiliary battery supplies power to operate the on-board charger when plug-in charging of the environmentally friendly vehicles is started. In particular, the auxiliary battery is generally used to start environmentally friendly vehicles or supply power to an electric field load. When the auxiliary battery is being continuously used, the auxiliary battery may be completely discharged, and thus it the environmentally friendly vehicle may not be started.

Furthermore, a known apparatus for charging a battery may include an auxiliary voltage charging unit that charges an auxiliary battery in addition to a high voltage charging unit that charges a high voltage battery, and separately converts AC power into a high voltage and an auxiliary voltage. However, charging efficiency may decrease due to frequent charging and discharging of the high voltage battery and the auxiliary battery.

The above information disclosed in this section is only for enhancement of understanding of the background of the invention and therefore it may contain information that does not form the prior art that is already known in this country to a person of ordinary skill in the art.

SUMMARY

The present invention provides a power supply system and method for charging a vehicle battery that improves operating efficiency of a charger and reduces energy consumption of an auxiliary battery by configuring a selective power supply circuit using diodes and a sequence.

An exemplary embodiment of the present invention provides a power supply system for charging a battery of a vehicle that may include: a charger configured to charge the battery; a charging controller configured to receive a voltage to charge the battery and to operate the charger; an auxiliary battery configured to supply a first direct current (DC) voltage for driving the charging controller; and a power supplier configured to generate a second DC voltage greater than the first DC voltage using external AC power, and to supply the second DC voltage to the charging controller as a driving power source for the charging, wherein first and second diodes may be respectively installed at output ends of the power supplier and the auxiliary battery, a cathode voltage of the second diode may be increased when the power supplier supplies the second DC voltage, and the first DC voltage of the auxiliary battery is blocked due to diode characteristics.

The cathode voltage of the second diode may be between the first DC voltage and the second DC voltage when the power supplier supplies the second DC voltage. The external AC power may be input from electric vehicle service equipment (EVSE) in a home or a charging station. The charger may boost the DC voltage to a high voltage with which the high voltage battery may be charged based on operations of a plurality of switching elements. The second diode may be switched on when the supply of the second DC voltage from the power supplier is stopped, and may supply the first DC voltage to the charging controller. The system may further include a communicator configured to receive a control pilot signal from the electric vehicle service equipment to establish a charging function.

An exemplary embodiment of the present invention provides a power supply method for charging a battery of a vehicle, the method may include: turning on a power latch when a control pilot signal is generated based on connection of electric vehicle service equipment; supplying a first DC voltage to a charging controller through an auxiliary battery and beginning a control operation to charge the battery; generating a second DC voltage greater than the first DC voltage using external AC power and supplying the second DC voltage to the charging controller as a driving power source for the charging control; and blocking the first DC voltage and supplying only the second DC voltage to the charging controller as a cathode voltage of a diode installed at the output end of the auxiliary battery is increased when the second DC voltage is applied.

The method may further include boosting supplied DC voltage to a high voltage and charging the battery. In addition, the method may further include stopping the generation of the second DC voltage when the supply of external AC power is stopped, and switching on the diode installed at the output end of the auxiliary battery and resuming the supply of the first DC voltage. The electric vehicle service equipment may be charging equipment provided in a home or a charging stand provided in an electric vehicle charging station.

Description of Symbols

Figure 1:
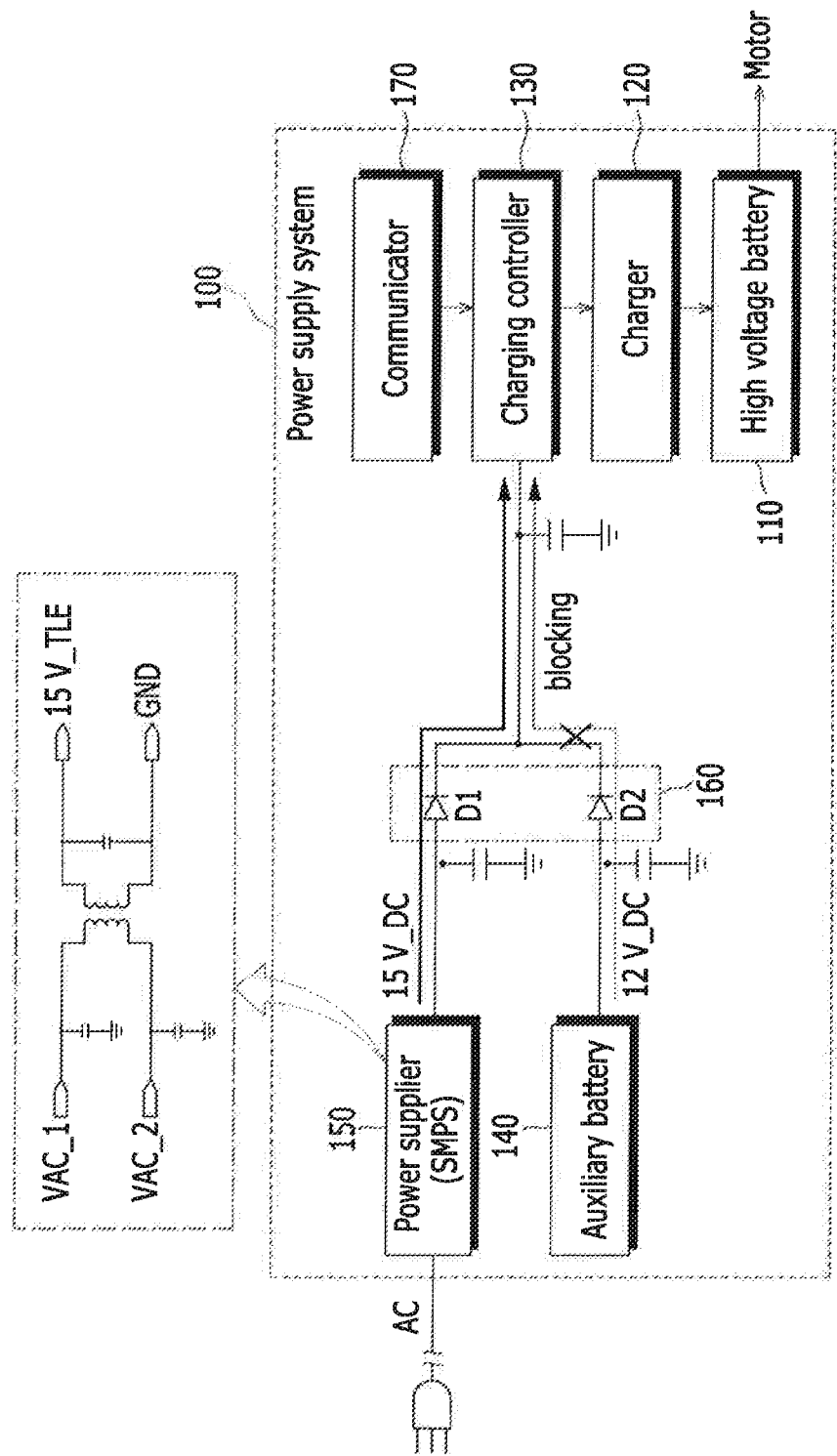
FIG. 1 shows an exemplary schematic diagram of a power supply system for charging a battery of a vehicle according to an exemplary embodiment of the present invention

100: power supply system for charging a battery
110: high voltage battery      120: charger

| | |
|---|---|
| 130: charging controller | 140: auxiliary battery |
| 150: power supplier | 160: diode unit |
| 170: communicator | |

DETAILED DESCRIPTION

In the following detailed description, exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements. In addition, the terms "-er" "-or", and "module" described in the specification mean units for processing at least one function and operation, and can be implemented by hardware components or software components and combinations thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, fuel cell vehicles, and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

A power supply system and method for charging a battery of a vehicle will now be described in detail with reference to the accompanying drawings.

FIG. 1 shows an exemplary schematic diagram of a power supply system for charging a battery of a vehicle according to an exemplary embodiment of the present invention. Referring to FIG. 1, a power supply system for charging a battery of a vehicle 100 (hereinafter referred to as a "power supply system" for convenience) may include a high voltage battery 110, a charger 120, a charging controller 130, an auxiliary battery 140, a power supplier 150, and a diode unit 160.

The high voltage battery 110 may be configured to store externally input power and supply stored energy to a vehicle motor as a driving power source. The charger 120 may be configured to charge the high voltage battery 110 using a DC voltage. The DC voltage may be converted from commercial alternating current (AC) power input from external electric vehicle service equipment (EVSE). Herein, the EVSE may be charging equipment provided in a home or a charging stand provided in an electric vehicle charging station.

The charger 120 may include a DC/DC converter that boosts the DC voltage to a high voltage by which the high voltage battery 110 may be charged based on operations of a plurality of switching elements. The charging controller 130 may be configured to operate the charger 120 by receiving a voltage for charging the high voltage battery 110, and execute charging operations of the charger 120 based on a predetermined program. The charging controller 130 may be configured to selectively receive the voltage from one of the auxiliary battery 140 and the power supplier 150 as described further below.

The auxiliary battery 140 may be used to start the environmentally friendly vehicle and supply power to an electric field load, and supply a first DC voltage to the charging controller 130. In particular, the first DC voltage may be, for example about 12 V. The power supplier 150 may be a switch mode power supply (SNIPS). The power supplier 150 may be configured to generate a second DC voltage greater than about 12 V using AC power when the power supplier 150 is connected with the EVSE, and supply the second DC voltage to the charging controller 130 as a driving power source for the charging control. In particular, the second DC voltage may be, for example about 15 V. In an exemplary embodiment of the present invention, for example, the first DC voltage of the auxiliary battery 140 may be about 12 V and the second DC voltage of the power supplier 150 may be about 15 V, which is greater than about 12 V, but they are not necessarily limited thereto.

The diode unit 160 may include a first diode D1 installed at an output end of the power supplier 150 and a second diode D2 installed at an output end of the auxiliary battery 140. According to an exemplary embodiment of the present invention, when the second DC voltage is supplied from the power supplier 150, the diode unit 160 may block 12 V of the auxiliary battery 140 having the substantially low voltage due to potential differences at both ends of each of the diodes D1 and D2 such that the diode unit 160 supplies only 15 V of the power supplier 150 to the charging controller 130.

The diode D1 and the diode D2 have diode characteristics such that the current flows from an anode to a cathode in one direction when the anode voltage is greater by a Vf (typically about 0.7 V) than the cathode voltage. Accordingly, when about 15 V of the power supplier 150 is applied, the cathode voltage of the second diode D2 at the output end of the auxiliary battery 140 may increase to exceed about 14 V (15 V–Vf) such that about 12 V is blocked and about 15 V is supplied to the charging controller 130 due to the diode characteristics. Hence, the power supply system 100 according to the exemplary embodiment of the present invention may mainly use about 15 V converted from external AC power by the power supplier 150 to reduce the discharge possibility of the auxiliary battery 140 and to improve the charging efficiency.

The power supply system 100 according to the exemplary embodiment of the present invention may further include a communicator 170 configured to communicate with the EVSE while the high voltage battery 110 is charged to allow the communicator 170 to receive a control pilot signal from the EVSE.

Figure 2:
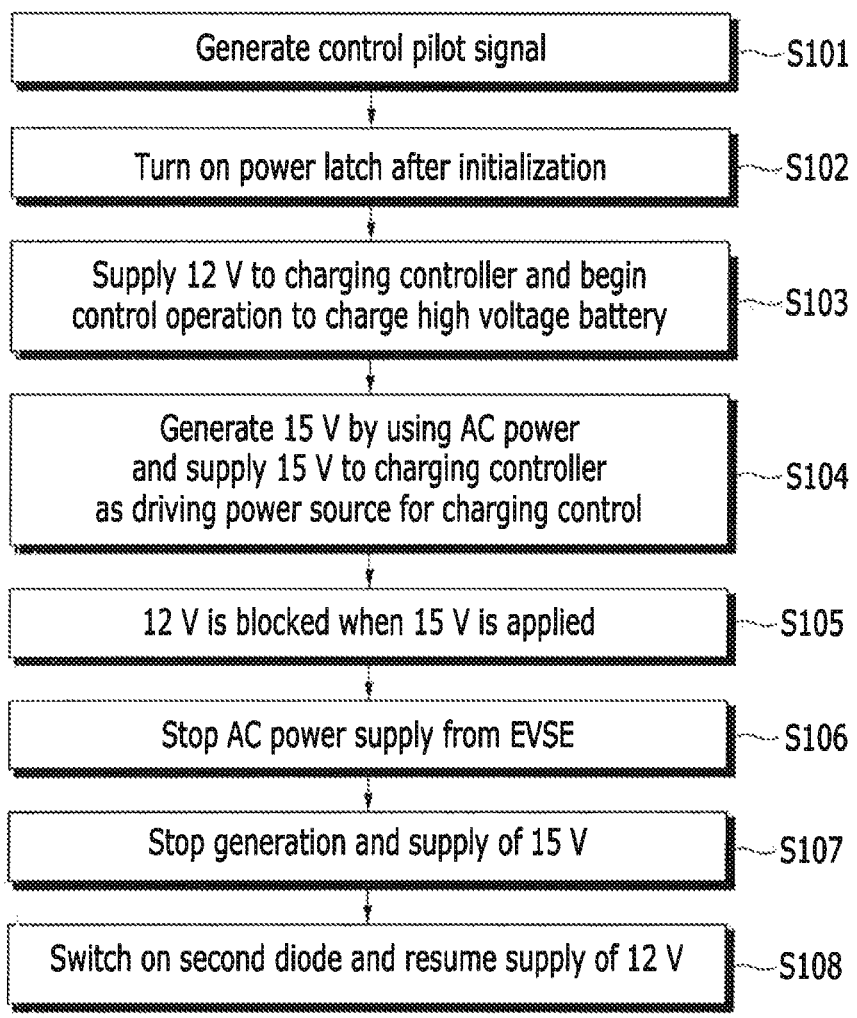
FIG. 2 is an exemplary flowchart illustrating a power supply method for charging a battery of a vehicle according to an exemplary embodiment of the present invention.
Figure 3:
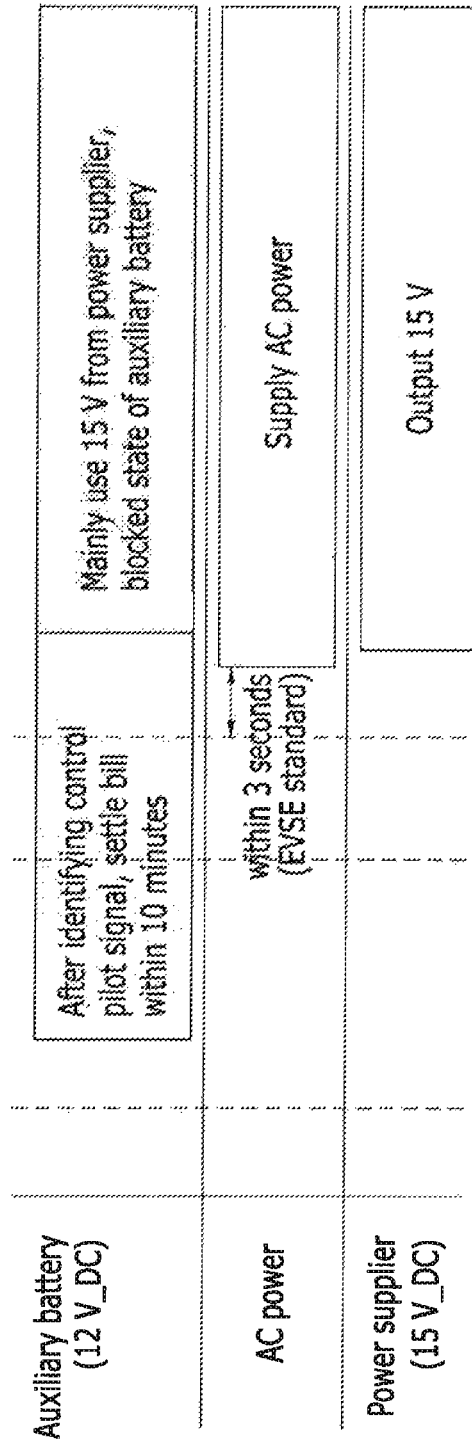
FIG. 3 shows exemplary sequences of supplying power to a charger according to an exemplary embodiment of the present invention.

A method for charging the high voltage battery 110 according to an exemplary embodiment of the present invention will be described in more detail with reference to FIG. 2 and FIG. 3. FIG. 2 is an exemplary flowchart illustrating a power supply method for charging a battery of a vehicle according to an exemplary embodiment of the present invention. Referring to FIG. 2 and FIG. 3, when a control pilot signal is generated according to the connection of EVSE provided in the electric vehicle charging station (S101), the power supply system 100 may be configured to receive the control pilot signal and turn on a power latch after system initialization (S102).

The control pilot signal may be an electrical signal generated from the EVSE to set a charging function, and may be transmitted to the communicator 170 via a charging coupler and a junction point. The control pilot signal may be used to check connection of the vehicle and the EVSE, determine whether to supply power based on a state of the vehicle, and transmit a maximum current value that may be supplied from the EVSE to the vehicle.

The power supply system 100 may be configured to supply about 12 V to the charging controller 130 through the auxiliary battery 140, and begin a control operation to charge the high voltage battery 110 (S103). The power supplier 150 of the power supply system 100 may be configured to generate about 15 V using input AC power and supply about 15 V to the charging controller 130 as a driving power source for the charging control (S104). In addition, when about 15 V is applied from the power supplier 150, the cathode voltage of the second diode D2 at the output end of the auxiliary battery 140 may increase to exceed 14 V (15 V–Vf) to block about 12 V and supply about 15 V to the charging controller 130 due to the diode characteristics (S105). When AC power supply from the EVSE is stopped based on charging completion (S106), the generation and supply of about 15 V from the power supplier 150 may be stopped (S107). The second diode D2 at the output end of the auxiliary battery 140 may then be switched on to resume the supply of about 12 V DC power (S108).

FIG. 3 shows sequences of supplying power to a charger according to an exemplary embodiment of the present invention. Referring to FIG. 3, the supply system 100 may be configured to identify the control pilot signal by accessing the EVSE. When setting for starting charging is completed, AC power may be supplied within about 3 seconds. Since supplying AC power, generating about 15 V, and blocking about 12 V may be performed sequentially within several seconds, about 12 V of the auxiliary battery 140 may be rarely substantially used when charging the high voltage battery 110. Hence, the power supply system 100 may be configured to mainly use the DC voltage that is converted from external AC power when the high voltage battery 100 is charged to reduce power consumption of the auxiliary battery 140 and improve the discharge possibility of the auxiliary battery 140.

Since the power supply system 100 has substantially low power consumption of the auxiliary battery 140 and it is not necessary to additionally charge the auxiliary battery 140 by a DC-DC converter compared to a conventional art, the charging efficiency may be improved. In addition, it may be possible to improve the charging efficiency using about 15 V of the power supplier 150 through external AC power.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the accompanying claims.

What is claimed is:

1. A power supply system for charging a battery of a vehicle, comprising:
   a charger configured to charge the battery;
   a charging controller configured to receive a voltage to charge the battery and to operate the charger;
   an auxiliary battery configured to supply a first direct current (DC) voltage to operate the charging controller; and
   a power supplier configured to generate a second DC voltage greater than the first DC voltage using external AC power, and to supply the second DC voltage to the charging controller as a driving power source to charge the battery,
   wherein first and second diodes are respectively installed at output ends of the power supplier and the auxiliary battery, a cathode voltage of the second diode is increased when the power supplier supplies the second DC voltage, and the first DC voltage of the auxiliary battery is blocked due to diode characteristics.

2. The system of claim 1, wherein the cathode voltage of the second diode is between the first DC voltage and the second DC voltage when the power supplier supplies the second DC voltage.

3. The system of claim 1, wherein the external AC power is input from electric vehicle service equipment (EVSE) in a home or a charging station.

4. The system of claim 3, wherein the charger boosts the DC voltage to a greater voltage by which the battery is charged based on operations of a plurality of switching elements.

5. The system of claim 1, wherein the second diode is switched on when the supply of the second DC voltage from the power supplier is stopped, and supplies the first DC voltage to the charging controller.

6. The system of claim 1, further comprising:
   a communicator configured to receive a control pilot signal from the electric vehicle service equipment (EVSE) to establish a charging function.

7. A power supply method for charging a battery of a vehicle, the method comprising:
   turning on, by a controller, a power latch when a control pilot signal is generated based on the connection of electric vehicle service equipment;
   receiving, by the controller, a first direct current (DC) voltage from an auxiliary battery;
   receiving, by the controller, a second DC voltage as a driving power source greater than the first DC voltage generated using external AC power; and
   wherein the first DC voltage is blocked and controller receives the second DC voltage as a cathode voltage of a diode installed at the output end of the auxiliary battery is increased when the second DC voltage is applied.

8. The method of claim 7, further comprising:
boosting, by the controller, supplied DC voltage to a high voltage and charging the battery.

9. The method of claim 7, further comprising:
stopping, by the controller, the generation of the second DC voltage when the supply of external AC power is stopped; and
switching on, by the controller, the diode installed at the output end of the auxiliary battery and resuming the supply of the first DC voltage.

10. The method of claim 7, wherein the electric vehicle service equipment is charging equipment provided in a home or a charging stand provided in an electric vehicle charging station.

11. A non-transitory computer readable medium containing program instructions executed by a controller, the computer readable medium comprising:
program instructions that turn on a power latch when a control pilot signal is generated based on the connection of electric vehicle service equipment;
program instructions that receive a first direct current (DC) voltage from an auxiliary battery;
program instructions that receive a second DC voltage as a driving power source greater than the first DC voltage generated using external AC power; and
wherein the first DC voltage is blocked and controller receives the second DC voltage as a cathode voltage of a diode installed at the output end of the auxiliary battery is increased when the second DC voltage is applied.

12. The non-transitory computer readable medium of claim 11, further comprising:
program instructions that boost supplied DC voltage to a high voltage and charging the battery.

13. The non-transitory computer readable medium of claim 11, further comprising:
program instructions that stop the generation of the second DC voltage when the supply of external AC power is stopped; and
program instructions that switch on the diode installed at the output end of the auxiliary battery and resuming the supply of the first DC voltage.

14. The non-transitory computer readable medium of claim 11, wherein the electric vehicle service equipment is charging equipment provided in a home or a charging stand provided in an electric vehicle charging station.

* * * * *